Figure 4:
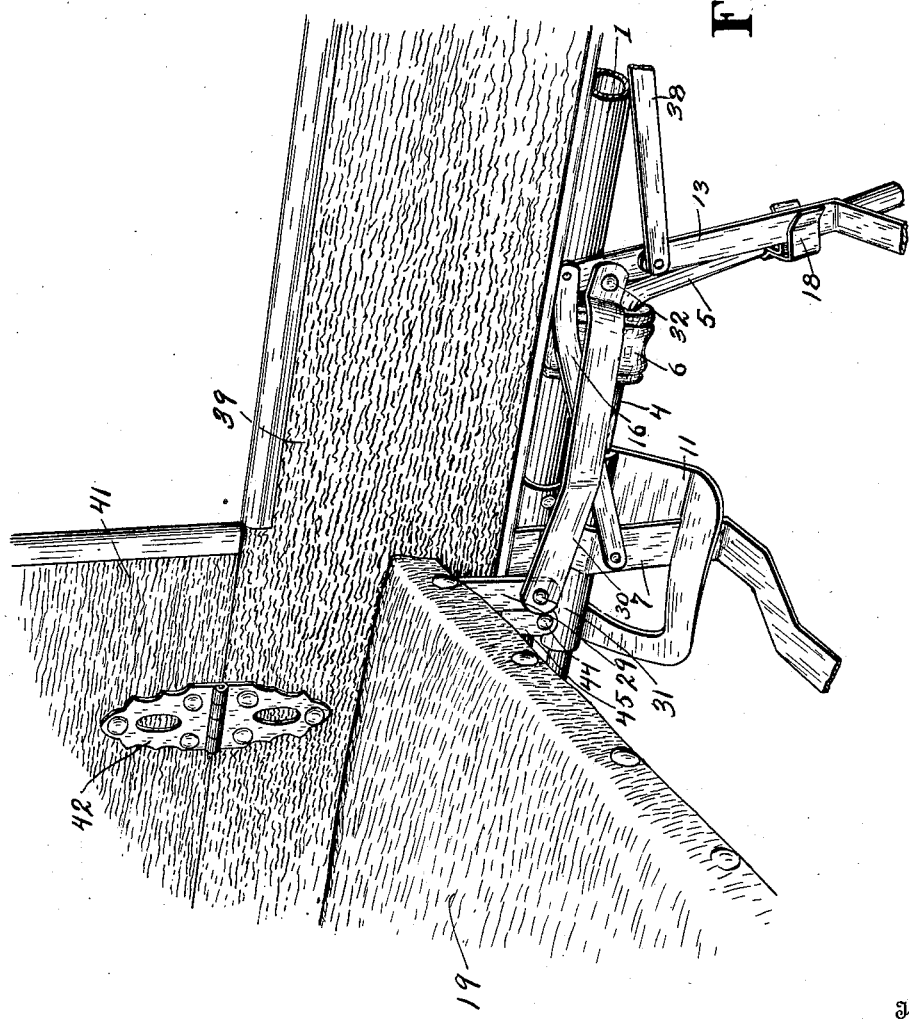

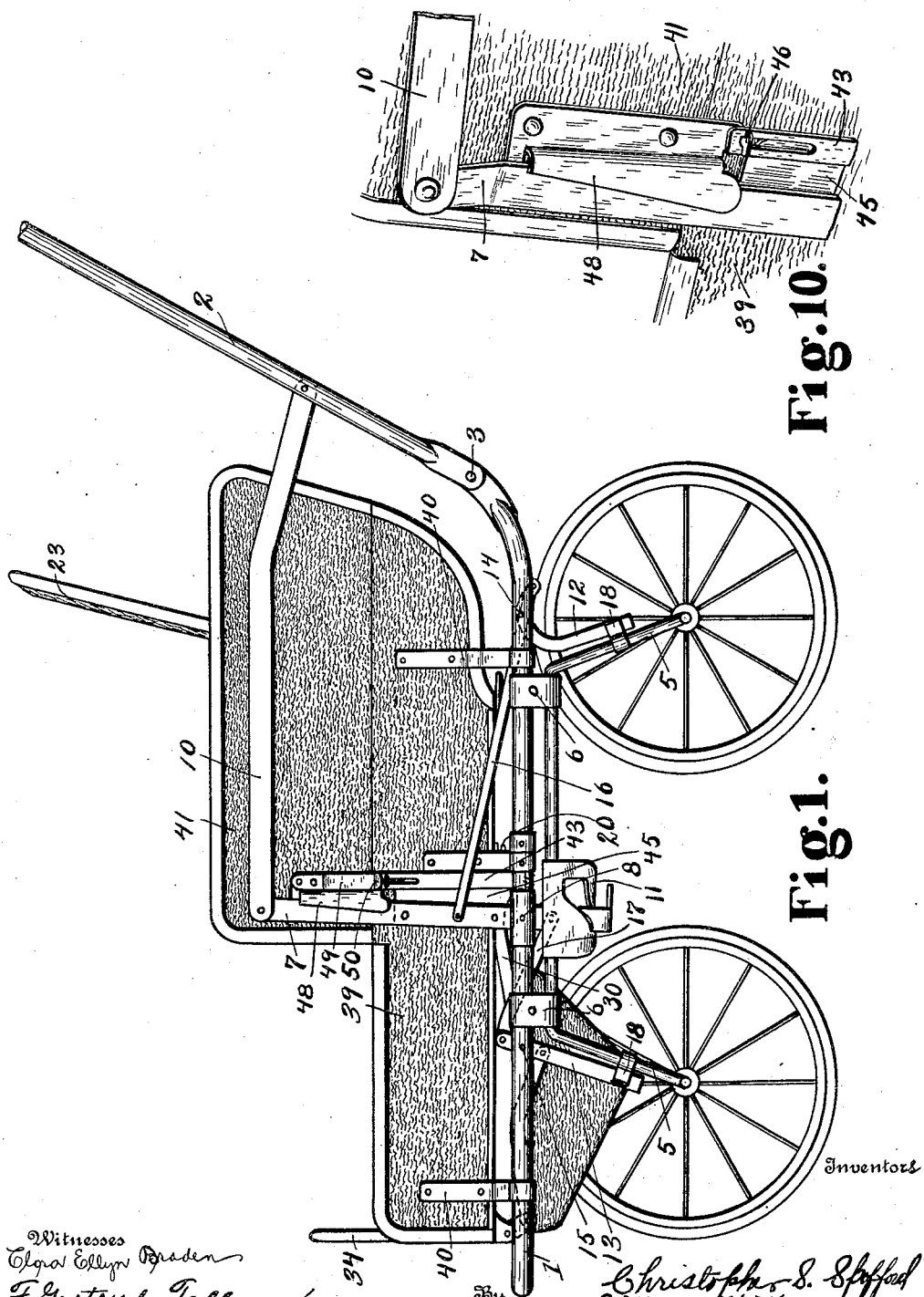

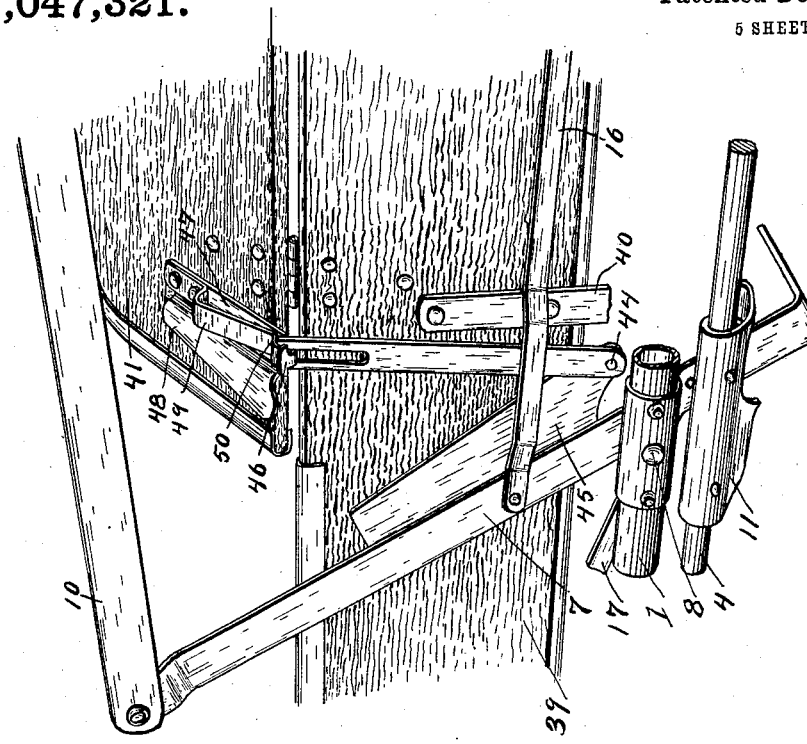
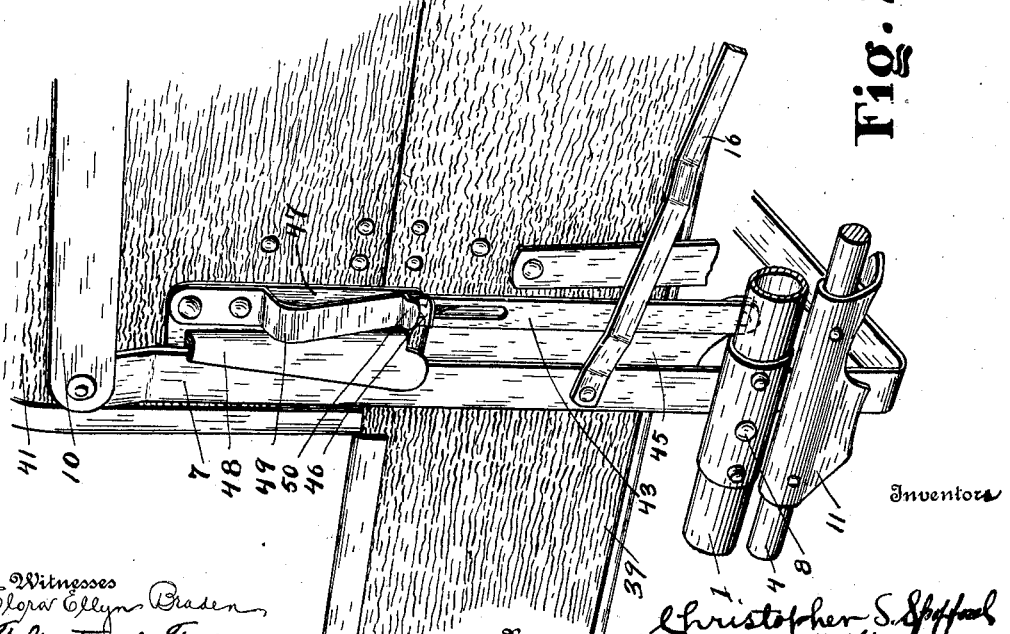

C. S. SPOFFORD & H. H. HERRMANN.
COLLAPSIBLE CARRIAGE.
APPLICATION FILED MAY 5, 1910.

1,047,321.

Patented Dec. 17, 1912.
5 SHEETS—SHEET 3.

Witnesses
Clara Ellyn Braden
F. Gertrude Tallman

Inventors
Christopher S. Spofford
and Harry H. Herrmann
By Chappell & Earl
Attorneys C. S. SPOFFORD & H. H. HERRMANN.
COLLAPSIBLE CARRIAGE.
APPLICATION FILED MAY 5, 1910.
1,047,321.
Patented Dec. 17, 1912.
5 SHEETS—SHEET 4.
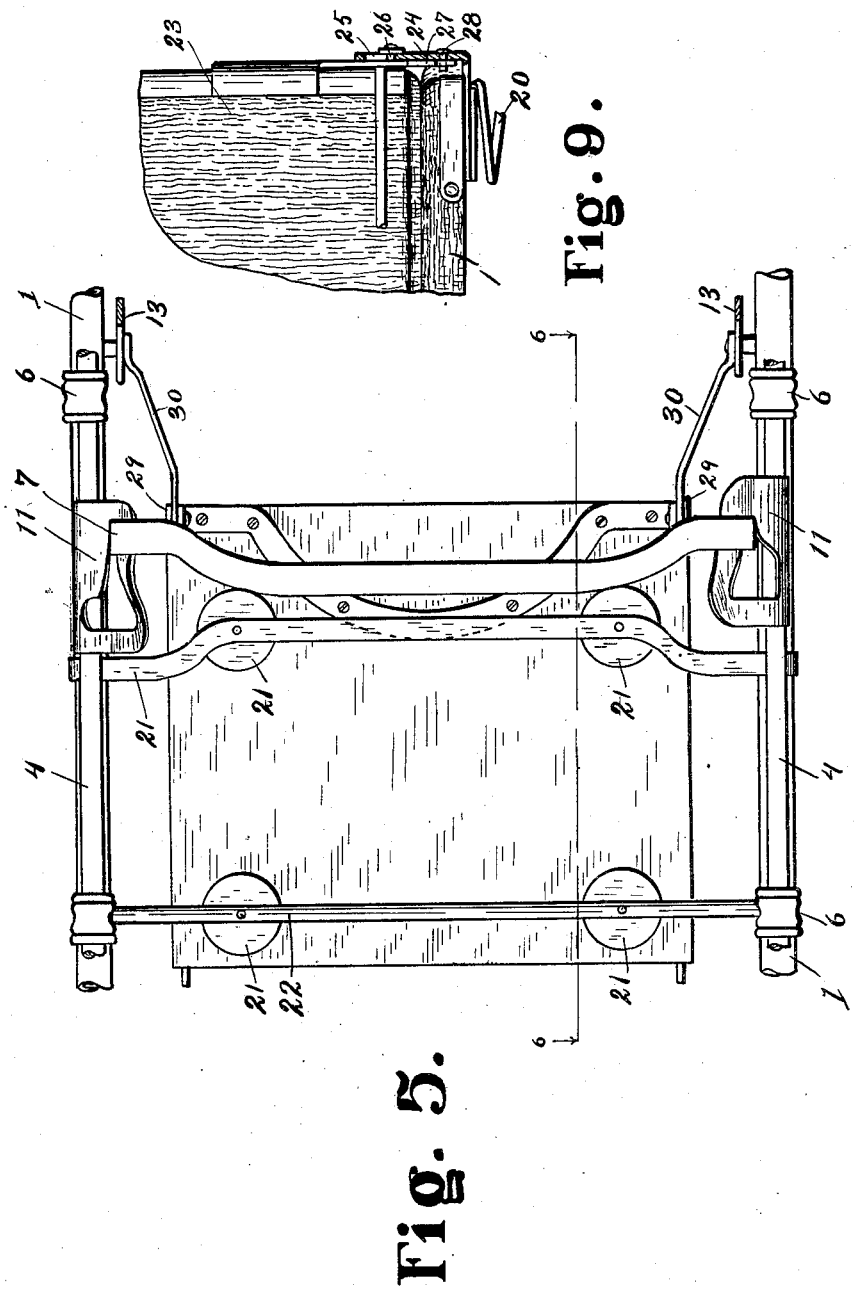

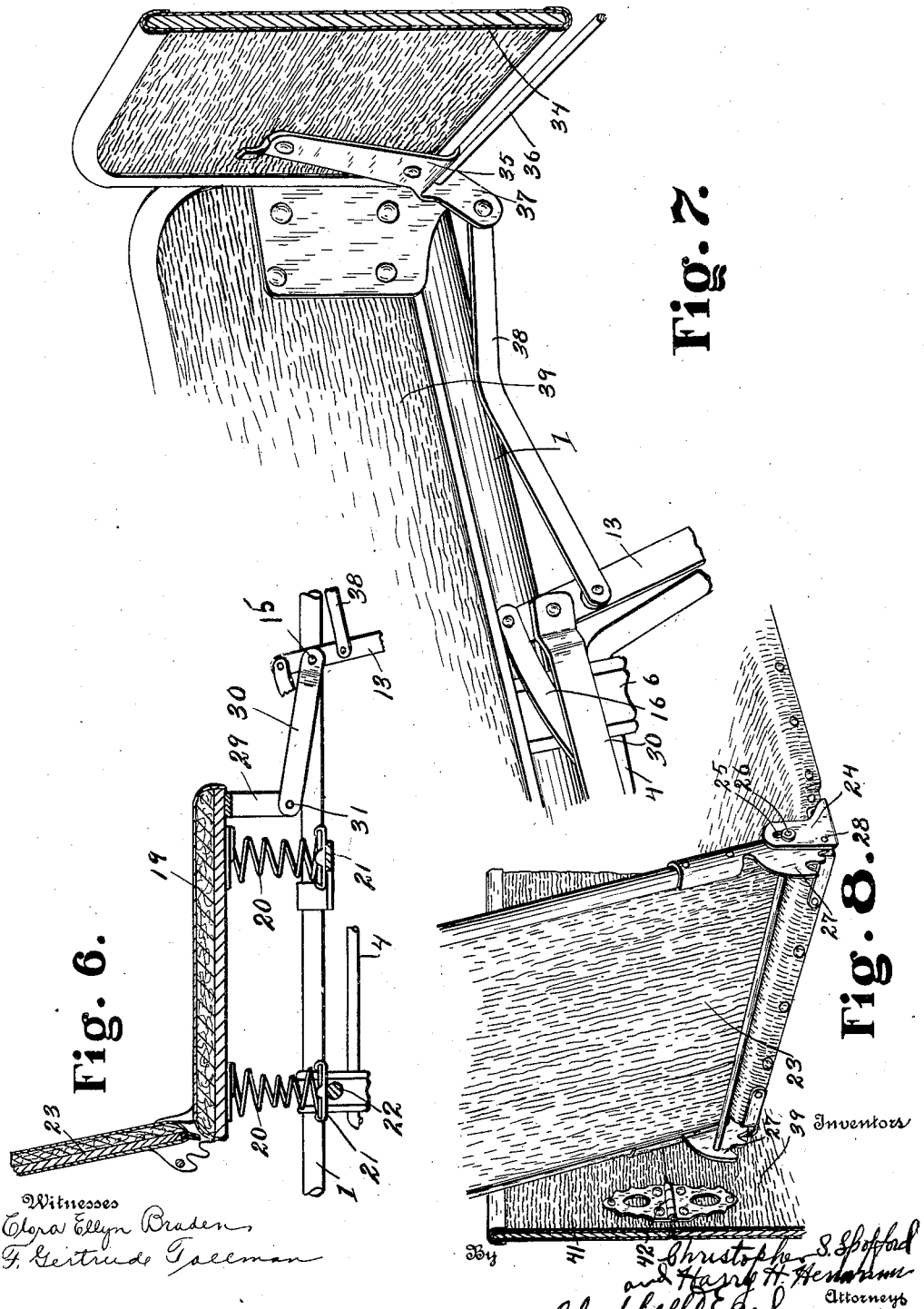

UNITED STATES PATENT OFFICE.

CHRISTOPHER S. SPOFFORD AND HARRY H. HERRMANN, OF STURGIS, MICHIGAN, ASSIGNORS TO STURGIS STEEL GO-CART COMPANY, OF STURGIS, MICHIGAN.

COLLAPSIBLE CARRIAGE.

1,047,321. Specification of Letters Patent. Patented Dec. 17, 1912.

Application filed May 5, 1910. Serial No. 559,475.

*To all whom it may concern:*

Be it known that we, CHRISTOPHER S. SPOFFORD and HARRY H. HERRMANN, citizens of the United States, residing at Sturgis, Michigan, have invented certain new and useful Improvements in Collapsible Carriages, of which the following is a specification.

This invention relates to improvements in collapsible carriages.

The main objects of this invention are to provide an improved collapsible carriage having sides which are automatically collapsed on the collapsing of the carriage.

Further objects, and objects relating to structural details, will definitely appear from the detailed description to follow.

We accomplish the objects of our invention by the devices and means described in the following specification.

The structure described constitutes one effective embodiment of our invention. Other embodiments would be readily devised by those skilled in the art.

The invention is clearly defined and pointed out in the claims.

A structure constituting an effective and preferred embodiment of the features of our invention is clearly illustrated in the accompanying drawing, forming a part of this specification, in which:

Figure 1 is a side elevation of a structure embodying the features of our invention, the upper end of the handle being broken away. Fig. 2 is an enlarged detail perspective, showing particularly the mechanism for collapsing the sides, the parts being shown in their erected position. Fig. 3 is an enlarged detail perspective of the parts shown in Fig. 2 in their partially collapsed position. Fig. 4 is an enlarged detail inside perspective, showing the forward end of the seat, and details of the wheel support actuating and bracing means. Fig. 5 is an inverted detail, showing portions of the wheel collapsing mechanism and the seat support. Fig. 6 is a detail vertical section through the seat and back, showing the details of the seat and back and the arrangement of the seat supporting springs, taken on a line corresponding to line 6—6 of Fig. 5. Fig. 7 is a detail perspective showing the mounting of the dash and the connections for collapsing it. Fig. 8 is an enlarged detail perspective of the seat, the back and one side showing the general relation of these parts. Fig. 9 is a detail view, partially in section, showing the means for adjustably supporting the back. Fig. 10 is a detail perspective of a slightly modified construction in which the springs 49 are omitted.

In the drawings, similar reference numerals refer to similar parts throughout the several views.

Referring to the drawing, 1 represents the running-gear frame. The handle 2 is mounted on the running-gear frame by means of the pivots 3. The wheel supports 4 are preferably formed of rods having downwardly-projecting wheel-carrying arms 5 thereon. The wheel supports are pivotally supported in hangers 6 on the running-gear frame, so that they are free to swing to permit the folding of the wheels upon each other under the running-gear frame.

The wheel supports are erected and collapsed by means of the levers 7, which are pivoted to the running-gear frame at 8. The upper ends of these levers 7 are connected by links 10 to the handle. The handle is pivoted to the frame to swing forwardly thereon when the structure is collapsed, thus swinging the upper end of the levers 7 forwardly. These levers 7 project downwardly below their pivots and engage the cam members 11 on the wheel supports. When the levers are actuated, the wheels are, through the coaction of these cams, collapsed and erected. The levers are locked in their erected position, and the wheel supports braced by means of the braces 12 and 13, which are pivoted to the running-gear frame at 14 and 15, respectively. These braces are connected to the levers 7 by means of the links 16 and 17, so that they are actuated through the actuation of the levers. The wheel supports are provided with clips 18, adapted to receive these braces when the parts are in their erected position.

The seat 19 is carried by the springs 20 disposed at the front and rear of the seat, the springs being mounted on the cross-pieces 21 and 22 of the running-gear frame. The back 23 is adjustably mounted on the seat to fold forwardly thereon when the structure is collapsed. The supporting means for the back illustrated consist of the brackets 24 on the seat, which are slotted at 25 to receive the pivots 26 on the back, the back being also provided with downwardly-facing segments 27 adapted to engage the pins 28 on the brackets 24. By this simple mechanism, the back is collapsibly and adjustably supported. All of the weight on the back and seat is carried by the springs 20. We preferably provide the seat with downwardly-projecting arms 29 on which the links 30 are pivoted at 31. The forward ends of the links are secured to the running-gear frame by the pivots 15.

We provide a dash, having hinged members 35 thereon, through which the pivot rod 36 is arranged. The hinge members 35 are provided with downwardly-projecting arms 37, which are connected by the links 38 to the braces 13, so that the dash is collapsed and erected through the collapsing and erecting of the wheel supports.

The sides of the carriage preferably consist of the lower sections or members 39, which are mounted on the running-gear frame by means of the metal straps 40, and the upper sections or members 41, which are hinged as at 42 to the upper edge of the lower sections. The lower sections preferably extend the entire length of the body, while the upper sections form the sides for the seat, the seat and back being arranged between the sides, as clearly appears from the drawing. The upper sections are adapted to fold inwardly on the seat and back when the back is collapsed. This is automatically done by connecting the side members to the levers 7 for erecting and collapsing the wheel supports. In the structure illustrated, the connection consists of the links 43, which are pivoted at 44 to the plates 45 secured to the levers, see Figs. 2 and 3. These links 43 are slotted to engage the T-shaped members 46 on the plates 47 which are secured to the side members 41. The forward edges of these plates are preferably bent outwardly to form cam-shaped lever-engaging clips 48 which engage the levers when the parts are in their erected position, so that the levers serve as braces or supports for the side members, the structure thus being made quite rigid when erected. On the plates 47 are springs 49 having shoulders 50 which engage the upper ends of the links 43, the links acting in collapsing the structure on these springs, so that in the event of the back not being collapsed before the collapsing of the carriage, the spring 49 yields, allowing the collapsing of the handle and wheel supports, and permitting the side members to remain in their erected position, thus avoiding injury to the connection. This structure thus comprises a slip joint. When the parts are in their erected position, the plates 45 close behind the links, as illustrated in Fig. 2. By thus arranging and connecting the parts, the carriage is entirely collapsed with the exception of the back, merely by the collapsing of the handle upon the running-gear frame.

The carriage is collapsed by collapsing the back forwardly upon the seat and releasing the lock and then grasping the forward end of the running-gear frame and the upper end of the handle and bringing them together.

In the modified structure shown in Fig. 10, the springs 49 are omitted. This structure does not possess the feature of the automatic collapsing of the side members but they are automatically erected.

We have illustrated and described our improvements in detail in the form in which we have embodied them in practice. We are, however, aware that they are capable of considerable variation in structural details without departing from our invention, and we desire to be understood as claiming the same specifically in the form illustrated, as well as broadly within the scope of the appended claims.

Having thus described our invention, what we claim as new and desire to secure by Letters Patent is:

1. In a collapsible carriage, the combination with the running-gear frame, of collapsible wheel supports; levers for actuating said wheel supports pivotally mounted on said running-gear frame; sides comprising lower sections mounted on said running-gear frame and upper sections hinged to said lower sections; and means for automatically collapsing and erecting the said upper side sections comprising rearwardly-projecting plates on said wheel support-actuating levers, links pivotally mounted on said plates, the upper ends of said links being longitudinally slotted, plates on said upper sections having T-shaped members thereon engaged in said slots of said links, the forward edges of said plates being off-set to provide cam-like clips adapted to engage said wheel support-actuating levers when the parts are in their erected position; and springs mounted on said plates on said upper side sections, having shoulders thereon adapted to normally engage the upper ends of said links.

2. In a collapsible carriage, the combination with the running-gear frame, of collapsible wheel supports; levers for actuating said wheel supports pivotally mounted on said running-gear frame; sides comprising lower sections mounted on said running-gear frame and upper sections hinged to said lower sections, and means for automatically collapsing and erecting the said upper side sections comprising rearwardly-projecting plates on said wheel-support-actuating levers, links pivotally mounted on said plates, the upper ends of said links being longitudinally slotted, plates on said upper side sections having T-shaped members thereon engaged in said slots of said links, and springs mounted on said plates on said upper side sections, having shoulders thereon adapted to normally engage the upper ends of said links.

3. In a collapsible carriage, the combination with the running-gear frame, of collapsible wheel supports; levers for actuating said wheel supports pivotally mounted on said running-gear frame; hinged side members; and means for automatically collapsing and erecting said side members comprising links pivotally connected to said levers, the upper ends of said links being longitudinally slotted, plates on said side members having T-shaped members thereon engaged in said slots of said links, the forward edges of said plates being off-set to provide cam-like clips adapted to engage said wheel support-actuating levers when the parts are in their erected position, and springs mounted on said plates on said side members adapted to normally engage the upper ends of said links.

4. In a collapsible carriage, the combination with the running-gear frame, of collapsible wheel supports; levers for actuating said wheel supports pivotally mounted on said running-gear frame; hinged side members; and means for automatically collapsing and erecting said side members comprising links pivotally connected to said levers, the upper ends of said links being longitudinally slotted, plates on said side members having T-shaped members thereon engaged in said slots of said links, and springs mounted on said plates on said side members adapted to normally engage the upper ends of said links.

5. In a collapsible carriage, the combination with the running-gear frame, of collapsible wheel supports; levers for actuating said wheel supports pivotally mounted on said running-gear frame; sides comprising lower sections mounted on said running-gear frame and upper sections hinged to said lower sections; and means for actuating the said upper side sections comprising links pivotally connected to said levers, the upper ends of said links being longitudinally slotted, members on said upper side sections engaged in said slots in said links, and cam-like clips adapted to engage said wheel-support actuating levers when the parts are in their erected position.

6. In a collapsible carriage, the combination with the running gear frame, of collapsible wheel supports; levers for actuating said wheel supports pivotally mounted on said running-gear frame; sides comprising lower sections mounted on said running-gear frame and upper sections hinged to said lower sections; and actuating connections for said levers to the said upper side sections comprising links pivotally connected to said levers, the upper ends of said links being longitudinally slotted, and members on said upper side sections engaged in said slots in said links.

7. In a collapsible carriage, the combination with the running-gear frame, of collapsible wheel supports; levers for actuating said wheel supports pivotally mounted on said running-gear frame; a seat; a back mounted to fold forwardly on said seat; hinged side members; and means for actuating said side members, comprising a connection with a slip joint for said levers to said side members adapted to permit the folding of said wheels independently of said side members when said side members are forcibly retained in their erected position.

8. In a collapsible carriage, the combination with the running-gear frame, of collapsible wheel supports; levers for actuating said wheel supports pivotally mounted on said running-gear frame; a seat; a back mounted to fold forwardly on said seat; hinged side members; and means for automatically collapsing and erecting said side members, comprising links pivotally connected to said levers and having a connection with a slip joint with said side members, and springs arranged to receive the collapsing thrust of said links.

9. In a collapsible carriage, the combination with the running-gear frame, of collapsible wheel supports; levers for actuating said wheel supports pivotally mounted on said running-gear frame; hinged side members; and means for actuating said side members comprising a connection with a slip joint for said levers to said side members whereby said levers may be actuated to collapse said wheels independently of said side members when said side members are forcibly retained in their erected position.

10. In a collapsible carriage, the combination with the running-gear frame, of collapsible wheel supports; levers for actuating said wheel supports pivotally mounted on said running-gear frame; hinged side members; and means for actuating said side members comprising links pivotally connected to said levers and having a slip connection with said side members, and springs arranged to receive the collapsible thrust of said links.

11. In a collapsible carriage, the combination with the running-gear frame, of collapsible wheel supports; levers for actuating said wheel supports pivotally mounted on said running-gear frame; sides comprising lower sections mounted on said running-gear frame and upper sections hinged to said lower sections; a seat; a back mounted to fold forwardly on said seat between said sides; a pivotally-supported dash; connections for said dash to said wheel support-actuating levers whereby said dash is automatically collapsed and erected on the collapsing and erecting of said wheel supports; and connections for said levers to said upper sections whereby said side sections are actuated through the actuation of said wheel support-actuating levers.

12. In a collapsible carriage, the combination with the running-gear frame, of collapsible wheel supports; levers for actuating said wheel supports pivotally mounted on said running-gear frame; sides comprising lower sections mounted on said running-gear frame and upper sections hinged to said lower sections; a seat; a back mounted to fold forwardly on said seat between said sides; and connections for said levers to said upper sections whereby said side sections are actuated through the actuation of said wheel-support actuating levers.

13. In a collapsible carriage, the combination with the running-gear frame, of collapsible wheel supports; levers for actuating said wheel supports pivotally mounted on said running-gear frame; sides comprising lower sections mounted on said running-gear frame and upper sections hinged to said lower sections; a pivotally-supported dash; connections for said dash to said wheel support-actuating levers whereby said dash is actuated on the collapsing and erecting of said wheel supports; and connections for said levers to said upper sections whereby said side sections are actuated through the actuation of said wheel support-actuating levers.

14. In a collapsible carriage, the combination with the running-gear frame, of collapsible wheel supports; means for actuating said wheel supports; a seat; collapsible side members therefor; and means comprising a slip joint for automatically collapsing and erecting said side members on the collapsing and erecting of the said wheel supports, comprising a yielding connection to said means for actuating said wheel supports whereby said wheel supports may be collapsed independently of said side members when said side members are forcibly retained in their erected position.

15. In a collapsible carriage, the combination of the running-gear frame; collapsible wheel supports; a seat; collapsible side members therefor; and means for automatically erecting said side members on the erecting of said wheel supports comprising a link having a stud and slot connection with said side members.

16. In a collapsible carriage, the combination of the running-gear frame; collapsible wheel supports; a seat; collapsible side members therefor; and means comprising a slip joint for automatically erecting said side members on the erecting of said wheel supports comprising a lost motion connection to said means for actuating said wheel supports whereby said wheel supports may be collapsed independently of said side members when said side members are forcibly retained in their erected position.

17. In a collapsible carriage, the combination with the running-gear frame, of a seat; a back for said seat mounted to be collapsed forwardly thereon; a handle pivotally connected to said frame to fold forwardly thereon; side members adapted to collapse inwardly; and connections comprising a slip joint for said side members to said handle adapted to automatically collapse and erect said side members on the collapsing and erecting of said handle, said connection being arranged to permit the collapsing of said handle independently of said side members when said side members are forcibly retained in their erected position.

In witness whereof, we have hereunto set our hands and seals in the presence of two witnesses.

CHRISTOPHER S. SPOFFORD. [L. S.]
HARRY H. HERRMANN. [L. S.]

Witnesses:
J. W. BENNETT,
E. M. PARKER.

---

Copies of this patent may be obtained for five cents each, by addressing the "Commissioner of Patents, Washington, D. C."